April 6, 1954 B. J. HANSON 2,674,682
ELECTRICALLY OPERATED INSECT DESTROYER
Filed May 23, 1952

INVENTOR.
BRYAN J. HANSON,
BY
McMorrow, Berman + Davidson
ATTORNEYS.

Patented Apr. 6, 1954

2,674,682

UNITED STATES PATENT OFFICE 2,674,682

ELECTRICALLY OPERATED INSECT DESTROYER

Bryan J. Hanson, Yakima, Wash.

Application May 23, 1952, Serial No. 289,581

4 Claims. (Cl. 219—45)

This invention relates to a device for destroying insects such as moths and the like, and more particularly, has reference to a device of the type stated that will include a means for attracting insects to the device, and a means for killing insects so attracted, both of which means are of an electrical nature.

It is one important object of the present invention to provide an insect destroyer of the character referred to that will be efficient in operation, so as to cause large numbers of insects to be attracted to said device, and effect the destruction of said insects when they move into close proximity to an insect destroying means that is a component part of the structure.

Another object of importance is to provide an insect destroying device as stated, which will be relatively simple in design, considering the benefits to be obtained from the use thereof, and will be engageable, in one preferred form in which the device is to be made, in any conventional light socket.

Still another object of importance is to provide an insect destroyer which will include an incandescent lamp adapted to be mounted in a conventional light socket and further adapted, when energized, to attract large numbers of insects, the invention further including a resistance element wound spirally about said lamp in such a manner as to cause the destruction of insects attracted to the lamp.

Still another object of importance is to provide a device of the character referred to which is so formed as to permit the mounting thereon of a reflecting shield which will cooperate with the incandescent lamp in attracting insects, and which will further cooperate with the resistance element of the device in directing the insects so attracted into contact with said element.

Other objects will appear from the following description, the claims appended thereto, and from the annexed drawing, in which like reference characters designate like parts throughout the several views, and wherein:

Figure 1:
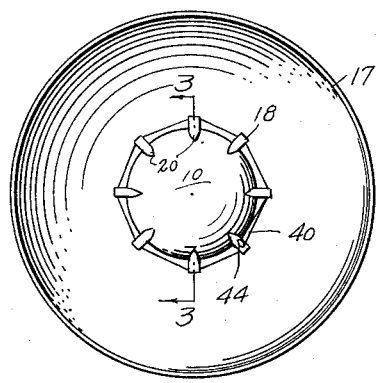
Figure 1 is a front elevational view of an insect destroyer formed in accordance with the present invention.
Figure 2:
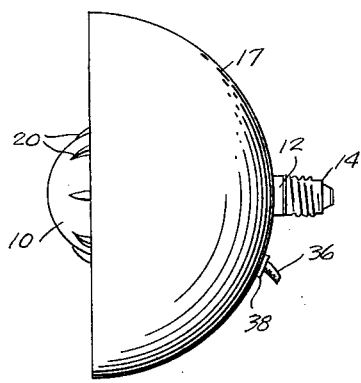
Figure 2 is a side elevational view.

Referring to the drawings in detail, the invention includes an incandescent lamp formed with a bulb 10 having at one end a neck 12 secured to a base 14. The bulb, in the illustrated example, has a medial portion of cylindrical formation, the outer end of the bulb being semi-spherical, and the inner end of the bulb tapering to merge into a cylindrical neck 12 of reduced diameter.

Although the bulb 10 has, in the present instance, been illustrated as being of a generally cylindrical formation, having tapered, rounded ends, it will be apparent, from the description to be provided hereinafter, that the bulb 10 can take other forms, and can, for example, be of rectangular cross sectional configuration, or can alternatively be of a generally globular shape. Additionally, the bulb might, I believe, be of triangular cross section or might be otherwise polygonally shaped. Accordingly, except as necessarily required by the scope of the claims appended hereto, I do not desire to be limited to the particular shape illustrated and described.

The base 14, in the present instance, is illustrated as being formed for engagement in a conventional light socket, but any type of base sufficient to provide a means for connecting the incandescent lamp to a source of electrical power can be employed.

Circumposed about the neck 12 is a collar 16 of insulating material, said collar forming a shoulder of annular formation upon the neck.

A reflecting shield 17 is preferably mounted upon the neck 12, and has a center opening receiving the neck, said shield abutting against the collar 16 and being bowl-shaped with a polished, inner reflecting surface spaced from the surface of the bulb 10 to cooperate with the bulb in attracting insects to the vicinity of the device.

Fixedly mounted upon the bulb 10 is a plurality of elongated, longitudinally curved ribs 18, said ribs being formed of any suitable insulating material and extending substantially for the full length of the bulb. As will be noted, the longitudinal curvature of the ribs 18 is intended to cause the ribs to remain in longitudinal contact with the surface of the bulb 10, and to follow the taper of the bulb, the inner ends of the ribs terminating contiguous to the neck 12.

At their opposite ends, the respective ribs 18 are preferably tapered to a point, as shown at 20 and 22 respectively.

The ribs 18 can also be formed from the material of which the bulb is made. In this event, the bulb itself would have its outer surface ridged to provide the desired ribs.

Figure 3:
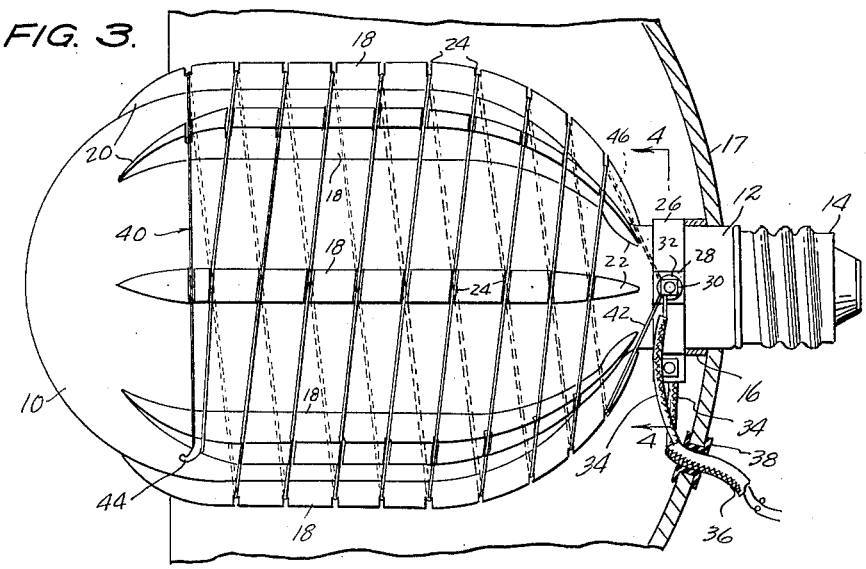
Figure 3 is a longitudinal sectional view, on an enlarged scale, taken substantially on line 3—3 of Figure 1.

Formed in each rib 18 is a longitudinal series of transverse notches 24, and in the illustrated embodiment of the invention, said notches are inclined slightly out of perpendicularity to the longitudinal center line of their associated rib. One of the notches of each rib, namely, that notch disposed nearest the outer end of the rib, may be retained in full perpendicularity to the longitudinal center line of the rib, as best shown in Figure 3.

Extending about the neck 12 is a split, metal clamp 26, said clamp preferably being of the type having spaced ears between which a fastening element is extendable, for releasably securing the clamp tightly about the neck.

Figure 4:
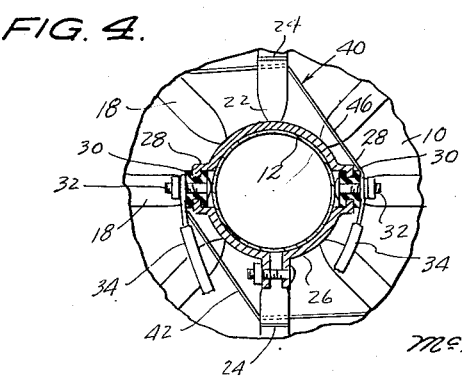
Figure 4 is a transverse sectional view, the scale being the same as that of Figure 3, taken substantially on line 4—4 of Figure 3.

At diametrically opposite locations thereupon, said clamp 26 is formed with apertured bosses 28, and engaged in the aperture of each boss is a liner 30 of insulating material flanged outwardly at its opposite ends for engaging opposite surfaces of the clamp (Figure 4).

A terminal screw 32 extends through the liner of each boss, and wound about or otherwise connected to said screw of each boss 28 is a lead 34. The leads 34 form an electrical cable 36, which is extended through an opening formed in the shield 17 adjacent the center opening of the shield, the cable-receiving opening of the shield being provided with a liner 38 of insulating material.

Wound spirally about the bulb 10 is a resistance element designated generally by the reference numeral 40. One end 42 of said element is connected to one of the terminal screws 32 (Figures 3 and 4), the resistance element being then wound spirally about the bulb toward the outer end of the bulb. That end portion of the resistance element having the end 42 is wound in one direction upon the bulb, being passed through alternate grooves 24 of each of the circumferentially spaced ribs 18.

On one of the ribs 18, I form an outwardly extended hook 44, and the medial portion of the resistance element is passed about said hook, the other end portion of the element being then wound spirally about the bulb 10 in a reverse direction and being engaged in the remaining grooves of the several ribs 18. Said last named end portion of the resistance element has an end 46 connected to the other terminal screw 32 (Figure 4).

It will be noted that the ribs 18 are relatively low, so as to cause the resistance element 40 to be spaced closely from the surface of the bulb 10. In this connection, the bulb is preferably formed of a heat-resistant glass, or other suitable transparent material having heat-resistant qualities, so as to permit the bulb to withstand the heat emanating from the resistance element.

Additionally, the several convolutions of the resistance element are spaced closely from one another, for the purpose of insuring the destruction of any insects flying into close proximity to the surface of the bulb 10.

In use of the device, it is merely necessary that the bulb be engaged in a suitable electrical socket, it being understood that the outer end of said socket will engage the outer surface of the shield 17 so as to hold the shield fixedly against the collar 16. The cable 36 is connected to a suitable source of electrical power, and thus the incandescent lamp and its associated resistance element will both be energized.

The incandescent lamp, when energized, will cast its rays outwardly and also against the polished reflecting surface of the shield 17, and this will cause insects to be attracted to the device in large quantities. As the insects fly into close proximity to the bulb 10, they will be destroyed by heat emanating from the resistance element.

It is also believed to be an important characteristic of the invention that the reflective shield cooperates with the bulb 10 not only in attracting the insects, but also in causing insects flying into the shield to be directed toward the resistance element 40.

In some forms of the device, I might provide a special support for the incandescent lamp, having electrical connections not only for the lamp, but also for the resistance element, with said connections being so arranged as to be simultaneously actuated during use of the device.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In an insect destroyer, an incandescent lamp including a bulb having a neck, a plurality of ribs secured to said bulb and extending longitudinally of the bulb, said ribs being in contact with the surface of the bulb throughout their lengths and being spaced circumferentially of the bulb, each rib having a plurality of transverse grooves spaced longitudinally thereof; a resistance element wound spirally about the bulb and terminating at its opposite ends adjacent said neck, said element being engaged in the grooves of the ribs in close-spaced relation to surface of the bulb; and a clamp circumposed about the neck of the bulb and having spaced, insulated terminals connected to the respective ends of said element.

2. In an insect destroyer, an incandescent lamp including a bulb having a neck; a plurality of ribs secured to and extending longitudinally of the bulb, said ribs being in contact with the surface of the bulb throughout their lengths and being spaced circumferentially of the bulb, each rib having a plurality of transverse grooves spaced longitudinally thereof; a resistance element wound spirally about the bulb and terminating at its opposite ends adjacent said neck, said element being engaged in the grooves of the ribs in close-spaced relation to the surface of the bulb; a clamp circumposed about the neck of the bulb and having spaced, insulated terminals connected to the respective ends of said element; a reflective, bowl-shaped shield having a center opening receiving said neck and surrounding the bulb in spaced relation to the resistance element; and a collar of insulating material extending about the neck of the bulb and interposed as a spacer means between the clamp and shield.

3. In an insect destroyer, an incandescent lamp including a bulb having a neck; a plurality of ribs secured to and extending longitudinally of the bulb, said ribs being in contact with the surface of the bulb throughout their lengths and being spaced circumferentially of the bulb, each rib having a plurality of transverse grooves spaced longitudinally thereof said ribs having one end terminating adjacent the neck of the bulb and the other end of one of the ribs having an outwardly extended hook formed thereon; a resistance element wound spirally about the bulb and terminating at opposite ends adjacent said neck, said element being engaged in the grooves of the ribs and being disposed in close-spaced relation to the surface of the bulb; and a clamp circumposed about the neck of the bulb and having spaced, insulated terminals connected to the respective ends of the resistance element, the resistance element having one end portion wound spirally about the bulb in one direction from one of the terminals toward said hook and having its medial portion passed about the hook, the other end portion of said element being wound spirally about the bulb in a reverse direction from the hook to the other terminal, said end portions of the element being respectively engaged in alternate grooves of each rib.

4. In an insect destroyer, an incandescent lamp including a bulb having a neck; a circumferential series of longitudinally extending ribs on said bulb; a resistance element wound spirally about the bulb and terminating at opposite ends adjacent said neck; a split clamp circumposed about and releasably engaged with said neck, said clamp having diametrically opposite, apertured bosses formed therein; sleeve-like liners of insulating material engaged in the apertures of the respective bosses, said liners being flanged outwardly at their opposite ends for engaging opposite surfaces of said clamp; and a terminal screw extending through the liner of each of said bosses, said screws projecting radially and outwardly from said neck and having the opposite ends of the resistance element connected thereto, said screws constituting means for connecting said element in circuit with a source of electricity.

References Cited in the file of this patent
UNITED STATES PATENTS

| Number | Name | Date |
|---|---|---|
| 652,635 | Potter | June 26, 1900 |
| 1,022,009 | Weinstraub | Apr. 2, 1912 |
| 1,120,003 | Warner | Dec. 8, 1914 |
| 1,319,728 | Smits | Oct. 28, 1919 |
| 1,527,976 | Haugart | Mar. 3, 1925 |
| 1,624,794 | Martin | Apr. 12, 1927 |
| 1,848,614 | Folmer et al. | Mar. 8, 1932 |